United States Patent
Hearn et al.

(10) Patent No.: US 10,860,374 B2
(45) Date of Patent: Dec. 8, 2020

(54) REAL-TIME LOCAL AND GLOBAL DATACENTER NETWORK OPTIMIZATIONS BASED ON PLATFORM TELEMETRY DATA

(71) Applicant: Intel Corporation, Santa Clara, CA (US)

(72) Inventors: James Robert Hearn, Portland, OR (US); Patrick Connor, Beaverton, OR (US); Kapil Sood, Beaverton, OR (US); Scott P. Dubai, Beaverton, OR (US); Andrew J. Herdrich, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/866,869

(22) Filed: Sep. 26, 2015

(65) Prior Publication Data

US 2017/0090987 A1     Mar. 30, 2017

(51) Int. Cl.
*G06F 3/00*          (2006.01)
*G06F 9/50*          (2006.01)
*G06F 9/4401*        (2018.01)
*G06F 9/48*          (2006.01)
*G06F 13/362*        (2006.01)

(52) U.S. Cl.
CPC .......... *G06F 9/5011* (2013.01); *G06F 9/4411* (2013.01); *G06F 9/4881* (2013.01); *G06F 9/5027* (2013.01); *G06F 13/362* (2013.01); *G06F 2209/502* (2013.01); *Y02D 10/00* (2018.01)

(58) Field of Classification Search
CPC .................. G06F 9/54; G06F 9/4411
USPC .................................. 719/310, 321
See application file for complete search history.

(56) References Cited

U.S. PATENT DOCUMENTS

| | | | |
|---|---|---|---|
| 8,490,103 B1* | 7/2013 | Belady | G06F 1/3243 718/104 |
| 9,143,412 B1 | 9/2015 | Nay et al. | |
| 2005/0188129 A1* | 8/2005 | Abdelilah | G06F 13/28 710/52 |
| 2007/0150895 A1* | 6/2007 | Kurland | G06F 9/3009 718/102 |
| 2008/0303676 A1 | 12/2008 | Kettler et al. | |
| 2010/0077185 A1* | 3/2010 | Gopalan | G06F 9/5033 712/220 |

(Continued)

FOREIGN PATENT DOCUMENTS

WO     2017052910     3/2017

OTHER PUBLICATIONS

Guangdeng Liao, Software techniques to improve virtualized I/O performance on multi-core systems. (Year: 2008).*

(Continued)

*Primary Examiner* — Lechi Truong
(74) *Attorney, Agent, or Firm* — Patent Capital Group

(57) ABSTRACT

In one embodiment, a system comprises platform logic comprising a plurality of processor cores and resource allocation logic. The resource allocation logic may receive a processing request and direct the processing request to a processor core of the plurality of processor cores, wherein the processor core is selected based at least in part on telemetry data associated with the platform logic, the telemetry data indicating a topology of at least a portion of the platform logic.

23 Claims, 4 Drawing Sheets

(56) References Cited

U.S. PATENT DOCUMENTS

| | | | | |
|---|---|---|---|---|
| 2010/0262819 A1* | 10/2010 | Yang | ............... | G06F 9/5055 713/2 |
| 2011/0126196 A1* | 5/2011 | Cheung | ............... | G06F 9/5077 718/1 |
| 2011/0153893 A1* | 6/2011 | Foong | ............... | G06F 13/24 710/268 |
| 2011/0265090 A1* | 10/2011 | Moyer | ............... | G06F 1/3203 718/103 |
| 2011/0296406 A1* | 12/2011 | Bhandari | ............... | G06F 9/5044 718/1 |
| 2013/0304694 A1 | 11/2013 | Barreto et al. | | |
| 2014/0089480 A1 | 3/2014 | Zhu | | |
| 2014/0143565 A1* | 5/2014 | Paul | ............... | G06F 1/206 713/320 |
| 2014/0258374 A1 | 9/2014 | Suryanarayanan et al. | | |
| 2014/0325520 A1* | 10/2014 | Bacchus | ............... | G06F 9/5016 718/104 |
| 2016/0018989 A1* | 1/2016 | Kiyota | ............... | G06F 3/0613 711/154 |
| 2016/0055041 A1* | 2/2016 | Kruglick | ............... | H04L 45/00 719/313 |
| 2016/0253212 A1* | 9/2016 | Solihin | ............... | G06F 9/5033 718/104 |
| 2017/0094377 A1 | 3/2017 | Herdrich et al. | | |

OTHER PUBLICATIONS

International Search Report and Written Opinion issued in PCT Application No. PCT/US2016/048260 dated Nov. 30, 2016; 11 pages.

* cited by examiner

… (1) …

REAL-TIME LOCAL AND GLOBAL DATACENTER NETWORK OPTIMIZATIONS BASED ON PLATFORM TELEMETRY DATA

FIELD

The present disclosure relates in general to the field of computer development, and more specifically, to real-time local and global datacenter network optimizations based on platform telemetry data.

BACKGROUND

A datacenter may include one or more platforms each comprising at least one processor and associated memory modules. Each platform of the datacenter may facilitate the performance of any suitable number of processes associated with various applications running on the platform. These processes may be performed by the processors and other associated logic of the platforms.

BRIEF DESCRIPTION OF THE DRAWINGS

Like reference numbers and designations in the various drawings indicate like elements.

DETAILED DESCRIPTION

Figure 1:
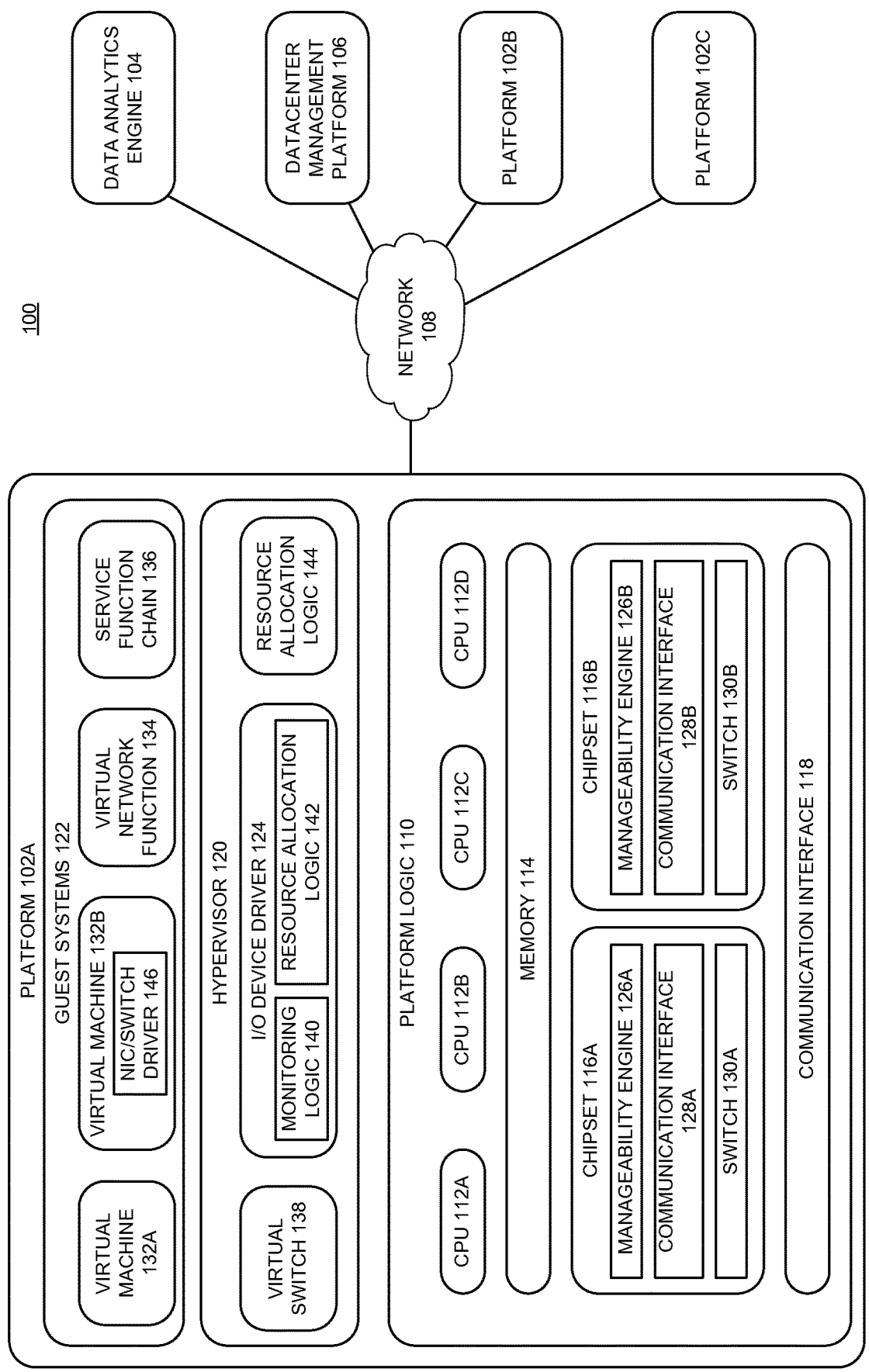
FIG. 1 illustrates a block diagram of components of a datacenter in accordance with certain embodiments.

FIG. 1 illustrates a block diagram of components of a datacenter 100 in accordance with certain embodiments. In the embodiment depicted, datacenter 100 includes a plurality of platforms 102, data analytics engine 104, and datacenter management platform 106 coupled together through network 108. A platform 102 may include platform logic 110 with one or more central processing units (CPUs) 112, memories 114 (which may include any number of different modules), chipsets 116, communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications.

In particular embodiments, various entities of datacenter 100, such as datacenter management platform 106, hypervisor 120, or one or more I/O device drivers 124 (e.g., an Ethernet device driver) may be capable of assigning resources (e.g., resources associated with cores of CPUs 112) of the platform logic 110 to processes run on platform 102A. In some systems, algorithms used by typical I/O device drivers may attempt to optimize platform usage by assigning queues or flows associated with guest machines to CPU cores based on which core originated a connection or may use a simple round robin algorithm to identify target CPUs cores. However, such systems are limited since these optimizations are merely local platform optimizations based on local considerations.

In various embodiments of the present disclosure, entities (e.g., datacenter management platform 106, hypervisor 120, or I/O device driver 124) of datacenter 100 may assign platform logic 110 resources to processes run by guest systems 122 in accordance with telemetry data associated with one or more platforms 102. Accordingly, optimizations made by these entities may be made based on a global view of the state of the platform 102a and/or entire datacenter 100 as represented by the telemetry data. As one example, I/O device driver 124 may direct workloads to resources (e.g., CPU cores) based on external platform behaviors at run-time, platform performance characteristics across and within sockets housing CPUs 112, and external events across one or more virtual or traditional networks of the datacenter 100. As another example, hypervisor 120 or other operating system may determine which core to schedule an I/O device driver 124 onto based on the state information.

Any suitable telemetry data regarding the platform(s) 102 may be collected or otherwise provided by any suitable entity, such as hypervisor 120 or other operating system, one or more I/O device drivers 124, one or more platform telemetry agents such as manageability engines 126 associated with chipsets 116, an entity external to datacenter 100, or a combination thereof. As non-limiting examples, the platform telemetry data may be collected using run-time sampling, run-time microbenchmarks, or pre-benchmarking. In some embodiments, this information may be provided to I/O device driver 124, hypervisor 120 or other operating system, a manageability engine 126, datacenter management platform 106, and/or data analytics engine 104. Any of these entities may process the data and make optimization decisions based on the data. These decisions may then be implemented by an I/O device driver 124, hypervisor 120, or other operating system.

As non-limiting examples, the telemetry data may indicate interconnect congestion; memory access patterns; load and health of cores of CPUs 112; current cache occupancy and/or memory bandwidth levels per thread, application, virtual machine, or other delineation; topology-based information such as which CPU cores have higher access to I/O bandwidth and/or memory bandwidth and lower latencies due to their location on the CPU die; and other information.

As described above, various embodiments of the present disclosure may include logic to optimize performance of the guest systems 122 within a platform or across multiple platforms 102. Such embodiments may allow optimization in deployments including Network Function Virtualization (NFV) and Software Defined Networking (SDN). For example, the capability to migrate VNFs (Virtual Network Functions) from one platform to another and other emerging NFV and SDN use cases provide an opportunity to perform local optimization based on the global virtual networking deployment of datacenter 100. In addition, a global view may enable local optimizations that deliver better security, quality-of-service (QoS), differentiation of service levels, traffic monitoring, traffic engineering of Service Function Chains (SFCs) across a SDN, and NFV deployment.

Using telemetry data associated with one or more of the platforms 102, the performance of one or more I/O device drivers 124, the platforms 102, and/or the entire datacenter 100 can be improved across several vectors including: raw throughput, latency, performance determinism, non-uniform memory access (NUMA) locality, scalability, power, and other suitable performance characteristics. Such optimizations can also be used for enhancing assurance for flow-directed QoS on the platforms 102 and across SFCs.

Each platform 102 may include platform logic 110. Platform logic 110 comprises, among other logic enabling the functionality of platform 102, one or more CPUs 112, memory 114, one or more chipsets 116, and communication interface 118. Although three platforms are illustrated, datacenter 100 may include any suitable number of platforms. In various embodiments, a platform 102 may reside on a circuit board that is installed in a chassis, rack, or other suitable structure that comprises multiple platforms coupled together through network 108 (which may comprise, e.g., a rack or backplane switch).

CPUs 112 may each comprise any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removeably coupled to platform 102. CPU 112 is described in further detail below in connection with FIG. 4. Although four CPUs are shown, a platform 102 may include any suitable number of CPUs.

Memory 114 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also comprise storage for instructions that may be executed by the cores of CPUs 112 or other processing elements (e.g., logic resident on chipsets 116) to provide functionality associated with the manageability engine 126 or other components of platform logic 110. Additionally or alternatively, chipsets 116 may each comprise memory that may have any of the characteristics described herein with respect to memory 114. Memory 114 may also store the results and/or intermediate results of the various calculations and determinations performed by CPUs 112 or processing elements on chipsets 116. In various embodiments, memory 114 may comprise one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 comprising any suitable logic to support the operation of the CPUs 112. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via integrated I/O controllers resident on each CPU.

In the embodiment depicted, each chipset 116 also includes a manageability engine 126. Manageability engine 126 may include any suitable logic to support the operation of chipset 116. In a particular embodiment, manageability engine 126 (which may also be referred to as an innovation engine) is capable of collecting real-time telemetry data from the chipset 116, the CPU(s) 112 and/or memory 114 managed by the chipset 116, other components of platform logic 110, and/or various connections between components of platform logic 110. Any suitable telemetry data may be collected, such as current CPU cache usage, current memory bandwidth use, and current I/O bandwidth use by each guest system 122 or component thereof (e.g., thread, application, etc.) or each I/O device (e.g., Ethernet device or hard disk controller). Additional telemetry data may include an amount of available memory space or bandwidth, an amount of available CPU cache space or bandwidth, or available I/O bandwidth for each I/O device. In addition, temperatures, currents, and/or voltages may be collected from various points of platform 102, such as at one or more locations of each core, one or more locations of each CPU 112, one or more locations of chipsets 116, or other suitable locations of the platform 102 (e.g., air intake and outflow temperatures may be measured).

In various embodiments, the manageability engine 126 operates as an out-of-band asynchronous compute agent which is capable of interfacing with the various elements of platform logic 110 to collect telemetry data with no or minimal disruption to running processes on CPUs 112. For example, manageability engine 126 may comprise a dedicated processing element (e.g., a processor, controller, or other logic) on chipset 116 which provides the functionality of manageability engine 126 (e.g., by executing software instructions), thus conserving processing cycles of CPUs 112 for operations associated with the guest systems 122. Moreover the dedicated logic for the manageability engine 126 may operate asynchronously with respect to the CPUs 112 and may gather at least some of the telemetry data without increasing the load on the CPUs.

The manageability engine 126 may also filter or otherwise process data it collects. For example, in some embodiments the manageability engine 126 may calculate service level agreement (SLA) metrics based on its collected telemetry data and enforce SLA violations by reporting such violations to the datacenter management platform 106 or local processing or by performing associated enforcement actions.

In various embodiments, manageability engine 126 reports the data it collects and/or the results of its data filtering or other processing to other elements in the datacenter, such as one or more I/O device drivers 124, hypervisor 120 or other operating system, data analytics engine 104, and/or datacenter management platform 106. In some embodiments, the telemetry data is reported periodically to one or more of these entities. In particular embodiments, a critical event such as an overloaded core or an excessive temperature may be reported prior to the normal interval for reporting telemetry data (e.g., a notification may be sent immediately upon detection).

In various embodiments, manageability engine 126 may include programmable code configurable to set which CPU(s) 112 the chipset 116 will manage and/or which telemetry data will be collected.

Chipsets 116 also each include a communication interface 128. Communication interface 128 may be used for the communication of signaling and/or data between chipset 116 and one or more I/O devices, one or more networks 108, and/or one or more devices coupled to network 108 (e.g., datacenter management platform 106 or data analytics engine 104). For example, communication interface 128 may be used to send and receive network traffic such as data packets. In a particular embodiment, communication interface 128 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 116 (e.g., manageability engine 126 or switch 130) and another device coupled to network 108. In some embodiments, network 108 may comprise a switch with bridging and/or routing functions that is external to the platform 102 and operable to couple various NICs distributed throughout the datacenter 100 (e.g., on different platforms) to each other. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interface 128 may allow communication of data associated with management and monitoring functions performed by manageability engine 126 (e.g., between the manageability engine 126 and the datacenter management platform 106 and/or data analytics engine 104). In various embodiments, manageability engine 126 may utilize elements (e.g., one or more NICs) of communication interface 128 to report the telemetry data (e.g., to datacenter management platform 106 or data analytics engine 104) in order to reserve usage of NICs of communication interface 118 for operations associated with guest systems 122. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 (e.g., one or more Peripheral Component Interconnect Express (PCIe) lanes coupled to CPUs 112). Switch 130 may be a physical or virtual (i.e., software) switch.

Platform logic 110 may include an additional communication interface 118. Similar to communication interface 128, communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 comprises one or more physical NICs. These NICs may enable communication between any suitable element of platform logic 110 (e.g., CPUs 112) and another device coupled to network 108 (e.g., elements of other platforms or remote nodes coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112).

Platform logic 110 may receive and perform any suitable types of processing requests. A processing request may include any request to utilize one or more resources of platform logic 110, such as one or more cores or associated logic. For example, a processing request may comprise a processor core interrupt; a request to instantiate a software component, such as an I/O device driver 124 or virtual machine 132; a request to process a network packet received from a virtual machine 132 or device external to platform 102 (such as a network node coupled to network 108); a request to execute a workload (e.g., process or thread) associated with a virtual machine 132, application running on platform 102, hypervisor 120 or other operating system running on platform 102; or other suitable request.

In various embodiments, processing requests may be associated with guest systems 122. A guest system may comprise a single virtual machine (e.g., virtual machine 132*a* or 132*b*) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

In some embodiments, a virtual machine 132*b* may be paravirtualized. For example, the virtual machine 132*b* may include augmented drivers (e.g., drivers that provide higher performance or have higher bandwidth interfaces to underlying resources or capabilities provided by the hypervisor 120). For example, an augmented driver may have a faster interface to underlying virtual switch 138 for higher network performance as compared to default drivers.

VNF 134 may comprise a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining may provide the ability to define an ordered list of network services (e.g. firewalls, load balancers) that are stitched together in the network to create a service chain.

A hypervisor 120 (also known as a virtual machine monitor) may comprise logic to create and run guest systems 122. The hypervisor 120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may collect any suitable telemetry data (such as that described above) and report the telemetry data to any suitable entity, such as one or more manageability engines 126, datacenter management platform 106, or data analytics engine 104. In one embodiment, hypervisor 120 reports the telemetry data through communication interface 118 to datacenter management platform 106 and/or data analytics engine 104 via an in-band approach (i.e., using the same communication interface used by the guest systems 122). Hypervisor 120 may also expose one or more I/O device drivers 124 (either directly or through an intermediate interface) to the manageability engine 126, thus allowing for communication between the two entities.

Hypervisor 120 may include a virtual switch 138 that may provide virtual switching and/or routing functions to virtual machines of guest systems 122. The virtual switch 138 may comprise a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may comprise a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may also include resource allocation logic 144 which may include logic for determining allocation of platform resources based on the telemetry data. Resource allocation logic 144 may also include logic for communicating with various entities of platform 102 to implement such optimization, such as components of platform logic 102 and resource allocation logic 142 of one or more I/O device drivers 124. For example, resource allocation logic 144 may direct which resources of platform logic 110 will be used to implement virtual switch 138 or one or more I/O device drivers 124. As another example, resource allocation logic 144 could target I/O at virtual machines 132 that have more resources allocated to handle the load than other virtual machines. In particular embodiments, resource allocation logic 144 may direct the movement of processes associated with applications and/or virtual machines across cores of the platform logic 110.

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112. In one example, the underlying I/O device is a physical NIC or physical switch. For example, in one embodiment, the underlying I/O device of I/O device driver 124 is a NIC of communication interface 118 having multiple ports (e.g., Ethernet ports).

In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

In various embodiments, when a processing request is received, the I/O device driver 124 or the underlying I/O device may send an interrupt (such as a message signaled interrupt) to any of the cores of the platform logic 110. For example, the I/O device driver 124 may send an interrupt to a core that is selected to perform an operation (e.g., on behalf of a virtual machine 132 or a process of an application). Before the interrupt is delivered to the core, incoming data (e.g., network packets) destined for the core might be cached at the underlying I/O device and/or an I/O block associated with the CPU 112 of the core. In some embodiments, the I/O device driver 124 may configure the underlying I/O device with instructions regarding where to send interrupts.

In various embodiments, I/O device driver 124 includes monitoring logic 140 which may be capable of collecting real-time and/or benchmark telemetry data associated with the I/O device driver 124. In some embodiments, hypervisor 120 and/or I/O device driver 124 may perform a series of benchmark tests to obtain various telemetry data. The benchmark tests may be run at any suitable time, such as when the platform 102 is powered on, when the I/O device driver 124 is initialized, or when a configuration change occurs in platform 102. In various embodiments, the benchmark tests may be instantiated by the hypervisor 120 or the I/O device driver 124 (in some embodiments in response to a request from manageability engine 126 to run benchmark tests). In some embodiments, particular benchmark tests may be performed during a period of time in which measured telemetry indicates that the benchmark tests would not disturb normal processes executed by the CPU cores.

In some embodiments, during a benchmark test, the hypervisor 120 and/or I/O device driver 124 may iterate through the cores and collect data associated with each core. The benchmark tests may measure latencies, bandwidths, determinism (i.e., the extent to which the amount of time required for a given task is predictable), or jitter associated with each CPU core (e.g., with respect to communication between the core and system memory, the core and other cores, the core and I/O devices such as NICs, the core and one or more caches, etc.) or other suitable information. As one example, small data transfers (such as a single cache line) may be performed across various components of the platform (e.g., cores, I/O devices, different CPU sockets, memory 114, etc.) and the latencies of each transfer measured.

In some embodiments, the benchmark tests may allow determination of various topological data of platform 102. For example, the data obtained may indicate the positioning of cores relative to each other (e.g., the amount of time it takes to communicate from one core to another may indicate how close the cores are to each other), the positioning of cores relative to one or more I/O devices (e.g., cores responding more quickly to requests from an I/O device may be deemed to be closer to the I/O device), the positioning of cores relative to a memory module of memory 114, which cores utilize particular shared caches (and their positioning with respect to the shared caches), the positioning of cores relative to particular interconnects (such as a QuickPath Interconnect), or other suitable information. The topology data may also include topology information involving measurements across multiple CPUs (e.g., how close a particular core of CPU 112a is to a particular core of CPU 112b). The topology data may enable the dynamic detection of nonuniformity in shared platform resources (for example, in some embodiments certain cores may have higher available memory bandwidth than others and others cores may have higher I/O bandwidth than others).

In particular embodiments, telemetry data indicating the topology or performance of the components of platform 102 may be obtained from an external source. For example, this data could be obtained based on an identification of various components of platform logic 110 (such as a serial number or stockkeeping unit (SKU) of a component) from a database that stores information on the configuration of the components. In various embodiments, such information could be coded into the hypervisor 120 or I/O device driver 124 or otherwise made available to the hypervisor 120 or I/O device driver 124.

Telemetry data may also be collected during normal operation of the platform 102, as I/O device driver 124 passively monitors traffic within the underlying I/O device. During such monitoring, the I/O device driver 124 may collect any suitable information such as that described above in connection with the benchmarks. In various embodiments, the data collected at runtime may indicate real-time conditions based on the flow of traffic, such as the load on each core, cache, and memory module. In at least some embodiments, bandwidth and latencies measured at runtime may reflect an available amount of bandwidth or average latencies due to the current traffic flow as opposed to a maximum bandwidth or a minimum latency that might be measured during the benchmark testing.

In some embodiments, the monitoring logic 140 may filter or otherwise process data it collects. In various embodiments, monitoring logic 140 reports the data it collects and/or the results of its data filtering or other processing to other elements in the datacenter 100, such as manageability engine 126, hypervisor 120 or other operating system, data analytics engine 104, and/or datacenter management platform 106. In some embodiments, the telemetry data is reported periodically to one or more of these entities. In various embodiments, monitoring logic 140 may include programmable code configurable to set which telemetry data will be collected by the monitoring logic.

In-band telemetry data collection may require workloads to be disrupted for telemetry collection. Moreover, telemetry data collection may be limited as particular cores are dedicated for VNF line-rate packet processing and should not be disturbed. Further, in-band telemetry data collection consumes compute cores, cache space, memory bandwidth, and other resources which may disrupt existing workloads by reducing their bandwidth, increasing jitter, or increasing overall latency.

In various embodiments, I/O device driver 124 and/or hypervisor 120 may collect and/or report telemetry data in an out-of-band manner. Such embodiments may include an interface between the hypervisor 120 and the manageability engine 126. The manageability engine 126 may receive the collected telemetry data through the interface and send the data to data analytics engine 104 and/or datacenter management platform 106. Such embodiments may allow out-of-band access to the I/O device without disrupting in-band accesses from the core(s) running the I/O device driver 124. Such embodiments may substantially reduce overheads and interrupt rates that occur in response to reconfiguration. In another embodiment, hypervisor 120 may report telemetry data through a communication interface (e.g., interface 118) that is also used by the guest systems 122, but may opportunistically report the data to datacenter management platform 106 and/or data analytics engine 104 using network interfaces that are not being used or that are underutilized, so as to minimize the effect on the performance of the platform 102.

I/O device driver 124 may also include resource allocation logic 142 which may include logic for determining allocation of platform resources based on the telemetry data. Resource allocation logic 142 may also include logic for implementing such optimizations, including communicating with the underlying I/O device to direct the I/O device to perform the optimizations.

Logic on platform 102 may include the ability to determine allocation of platform resources based on the telemetry data (including real-time measurements and/or benchmark data). For example, the logic may determine which core to route an interrupt to, which cores to avoid, where to place a process associated with a particular virtual machine or group of virtual machines, which resources should be associated with an I/O device driver 124 (e.g., which core should be used to run the I/O device driver 124 and/or which caches or memory modules should be used to store data used by the I/O device driver 124), how to reconfigure the platform to optimize resource usage, or other suitable resource allocation decisions. In some cases, the optimization may involve a different platform. For example, a process, virtual machine, or other workload could be placed on or migrated to a different platform with an assigned core, cache, and/or memory of that platform.

Any suitable logic may make one or more of these optimization decisions. For example, resource allocation logic 142 of I/O device driver 124, data analytics engine 104, datacenter management platform 106, resource allocation logic 144 of hypervisor 120 or other operating system may be capable of making such decisions (either alone or in combination with other elements of the platform 102). In a particular embodiment, datacenter management platform 106 may communicate (using in-band or out-of-band communication) with the hypervisor 120 to specify the optimizations that should be used in order to meet policies stored at the datacenter management platform.

In various embodiments, optimizations may be made in real time based on the level of traffic and the workload on the cores as measured by the collected telemetry data. Global (e.g., platform-wide) or local (e.g., with respect to a particular virtual machine, guest system, application running on a guest system, etc.) metrics that may be optimized by the logic of the platform may include minimizing latency of performance of a processing request, minimizing the effect of neighboring cores on the delivery of interrupts, minimizing interrupt latency, and maximizing overall throughput and performance. In some instances, a series of local optimizations (e.g., selections of particular cores for particular workloads) may be made in order to achieve a global optimization point (e.g., to maximize performance or minimize latency of a particular application).

As mentioned above, one of the optimizations may include placement of an I/O device driver 124 and associated resources. For example, high performance I/O device drivers may be run on cores that are closest to I/O blocks of CPUs 112. Resources associated with the I/O device driver 124 may also be placed at optimal locations. For example, queues used by the I/O device driver 124 (e.g., to store instructions used to run the driver or as a buffer for incoming or outgoing packets directed by the driver) or hardware DMA descriptors may be assigned to a particular cache or memory module (e.g., one with high performance and/or located near the core running the I/O device driver 124).

Particular workloads of guest systems 122 (including core interrupts) may be assigned to a particular core based on the telemetry data, such as a bandwidth of a core or the core-to-cache, core-to-I/O, or core-to-memory bandwidth. For example, high priority or otherwise demanding workloads or connections may be steered to high performing cores while low priority workloads may be steered to relatively low performing cores. Workloads may also be assigned to caches or memories based on any suitable telemetry data. For example, a particular cache may include one or more partitions to store data associated with higher priority workloads. As another example, memory local to a particular CPU may be used for processes running on that CPU.

In some embodiments, as workloads are distributed among the cores, the hypervisor 120 may steer a greater number of workloads to the higher performing cores than the lower performing cores. In certain instances, cores that are exhibiting problems such as overheating or heavy loads may be given less tasks than other cores or avoided altogether (at least temporarily). Workloads associated with applications, services, containers, and/or virtual machines 132 can be balanced across cores using network load and traffic patterns rather than just CPU and memory utilization metrics.

If certain processes use the I/O device at a relatively high rate, these processes may be affinitized to a core that is located near the I/O device (i.e., close to an I/O block of a CPU 112). Similarly, if a communication flow is latency sensitive, it may be placed on a high performance I/O device (e.g., NIC) and a high performance core that is close to that I/O device.

In various embodiments, the optimizations may include moving, by the I/O device driver 124, control structures across cores. For example, a shared ring that is used to communicate software running on a first core could be moved along with its interfacing driver to a more optimal core.

The optimizations may also take into account the structure of guest systems 122 that may utilize communications between multiple virtual machines (e.g., VNF 134 or SFC 136). For example, workloads associated with a first virtual machine of an SFC may be placed on a core next to a core that executes workloads associated with a second virtual machine of the SFC, such that communications from the first virtual machine may be quickly sent to the second virtual machine.

In some embodiments, the optimizations may facilitate dynamic scalability which may be particularly important as it pertains to maintaining high QoS with respect to service function chaining and other guest systems 122. In a particular embodiment, I/O device driver 124 may collect telemetry data indicating traffic flow. When the traffic flow rate on the platform 102 is low or moderate, I/O device driver may send interrupts to cores closest to the I/O device (e.g., NIC) to maximize latency/bandwidth locality for better performance and lower latency. For example, the I/O device driver 124 may load balance the interrupts among a select number of high performance cores. In some embodiments, if the flow rate may be served without a reduction in performance by a single high performance core then all interrupts may be sent to that core. If the interrupts are load balanced among a plurality of cores, a simple round robin technique or a methodology that directs a higher percentage of the requests to one or more higher performing cores may be used to load balance.

When the flow rate is high (e.g., greater than a particular threshold), then interrupts may be distributed across all cores to maximize throughput across the platform. In some embodiments, the number of cores that the I/O device driver 124 sends interrupts to may increase in proportion to the traffic flow rate to ensure high performance for existing flows.

In this manner workloads associated with applications, services, containers, or virtual machines 132 can be balanced across cores using network load and traffic patterns rather than just CPU and memory utilization metrics.

In some embodiments, optimizations (such as the selection of cores) may be further based on one or more packet characteristics detected by I/O device driver 124. As one example, small packets on the order of 64 B may be keep-alives from phone applications on handsets on a mobile LTE network and may need a quick response and thus would be sent to a core with low latency (e.g., a core near the I/O device). As another example, latency-sensitive Transmission Control Protocol (TCP) packets may also be sent to a core with low latency.

In various embodiments, the placement of a workload may be further based on compatibility with components of platform logic 110. For example, requirements of the workload may be checked against a SKU, cache type, supported bus, QPI version, or other suitable characteristic of CPU 112 to determine whether the workload may be run by a core of the CPU. If any CPUs 112 are incompatible with the workload, then the best remaining core in the platform logic 110 may be selected for the workload.

In various embodiments, the datacenter management platform 106 may receive telemetry data from and manage optimizations across multiple platforms 102. The datacenter management platform 106 may communicate with hypervisors 120 (e.g., in an out-of-band manner) or other operating systems of the various platforms 102 to implement optimizations directed by the datacenter management platform. In this manner, datacenter management platform may control workload placement and overall datacenter performance.

In some embodiments, logic of platform 102 may include a closed loop controller that would compare performance before an optimization is made and after an optimization is made to see how the optimization affected performance. The closed-loop controller may be operable to optimize the hypervisor's placement of processes that are using the I/O device driver 124 to be closer to the I/O device driver 124 and evaluate the improvements dynamically. The logic that implements the closed loop controller may be located in any suitable entity of datacenter 100 such as a hypervisor 120 or other operating system, I/O device driver 124, or combination thereof.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the datasystem 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, guest systems 122 may communicate with nodes that are external to the datacenter 100 through network 108.

Figure 2:
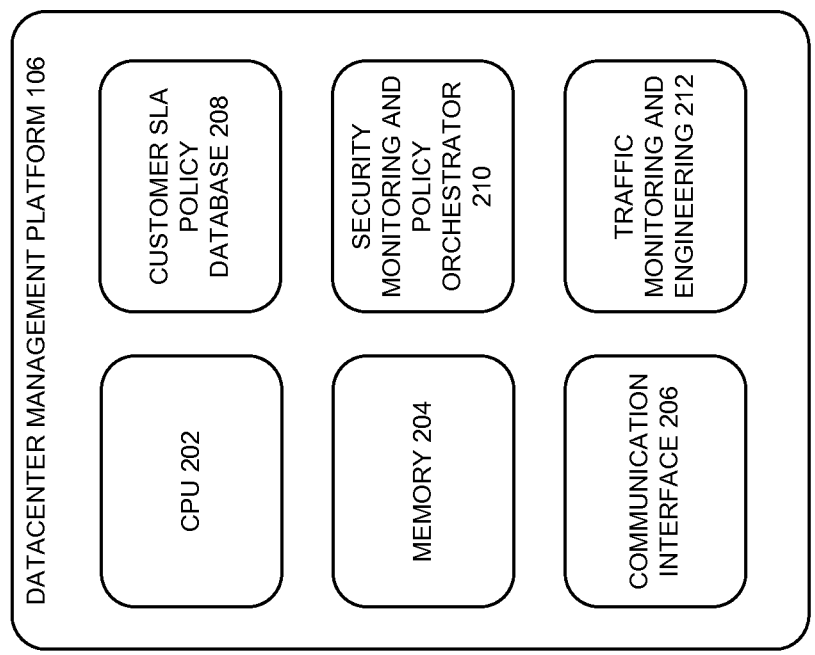
FIG. 2 illustrates a block diagram of a datacenter management platform in accordance with certain embodiments.

FIG. 2 illustrates a block diagram of a datacenter management platform 106 in accordance with certain embodiments. Datacenter management platform 106 includes, among any other suitable hardware, at least one CPU 202, memory 204, and communication interface 206 which may include any suitable characteristics as described above with respect to CPUs 112, memory 114, and communication interface 118 to facilitate the operations of datacenter management platform 106. In various embodiments, datacenter management platform 106 may be distinct from the platforms 102 of datacenter 100 (e.g., it may reside in a different physical module or on a different circuit board). Datacenter management platform 106 may be in communication with each of the platforms 102 and/or data analytics engine 104 through communication interface 206 and may collect telemetry data from the platforms 102 and direct the platforms to perform optimizations as described herein. In one embodiment, communication interface 206 uses an out-of-band approach to communication with manageability engines 126 and an in-band approach to communicate directly with the hypervisors 120 or operating systems running on the platforms 102.

Customer service level agreement (SLA) policy database 208 includes logic to associate an application running on one or more platforms 102 with an SLA so that datacenter management platform 106 may evaluate whether performance targets are being met with respect to the application. SLAs may be based on any suitable metrics, such as metrics associated with virtual machine or VNF operations (e.g., virtual machine provisioning latency and reliability, virtual machine clock error, virtual machine dead on arrival, etc.) or virtual network operations (e.g., packet delays, delay variations, network outages, port status, policy integrity, etc.).

Security monitoring and policy orchestrator 210 may include logic for monitoring and managing security within datacenter 100. For example, security monitoring and policy orchestrator 210 may include intrusion detection and mitigation, denial of service detection and mitigation, antivirus, and other security functions. Security monitoring and policy orchestrator 210 may maintain a global view of datacenter 100 and deployments of virtual machines 132 within the datacenter from a security standpoint as well as manage interconnections between various segments of networks within datacenter 100 (e.g., the communication/bridging across various VLANs).

Traffic monitoring and engineering module 212 includes logic to monitor traffic on platforms 102 of the datacenter and to direct optimizations for that traffic. Module 212 may communicate with data analytics engine 104, manageability engines 126 from various platforms, and/or hypervisors 120 or other operating systems from various platforms to receive telemetry data, determine suitable optimizations, and direct the performance of the optimizations. In some embodiments, datacenter management platform 106 instructs hypervisor 120 or other operating system to perform inband benchmark tests to gather additional telemetry data. In various embodiments, datacenter management platform may include logic for data aggregation and analytical algorithms and/or may utilize the functionality of data analytics engine 104 to determine which optimizations to perform.

As one example of an optimization that could be made, module 212 may select a particular platform 102 and/or particular elements of platform logic 110 for a workload or the instantiation of a virtual machine 132, a VNF 134, or SFC 136 based on optimizing performance for that element or for the datacenter as a whole. As another example, module 212 may direct the migration of a workload or virtual machine 132, VNF 134, or SFC 136 from one platform (e.g., 132a) to another platform (e.g., 132b) to improve performance for the particular element migrated or for the datacenter as a whole. In some embodiments, module 212 may provide hypervisors 120 of various platforms 102 guidelines for optimizations made by the hypervisors 120 (including optimizations that may be made by the I/O device driver 124). In one use case, module 212 may detect that an SFC 136 is underperforming (e.g., not meeting a predefined QoS), and may seek to improve performance of the SFC 136 by directing a hypervisor 120 to move a workload associated with SFC 136 from a lower performing core to a higher performing core. In another use case, module 212 may detect that links between two virtual machines 132 are underperforming and may move one or both of the virtual machines 132 to different cores to increase link performance.

Figure 3:
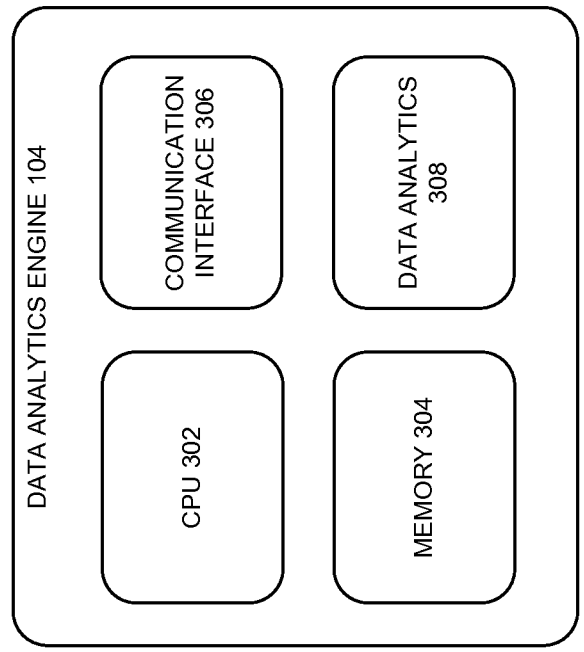
FIG. 3 illustrates a block diagram of a data analytics engine in accordance with certain embodiments.

FIG. 3 illustrates a block diagram of a data analytics engine 104 in accordance with certain embodiments. Data analytics engine 104 includes, among any other suitable hardware, at least one CPU 302, memory 304, and communication interface 306 which may include any suitable characteristics as described above with respect to CPUs 112, memory 114, and communication interface 118 to facilitate the operations of data analytics engine 104. In various embodiments, data analytics engine 104 may be distinct from the platforms 102 of datacenter 100 and/or the datacenter management platform (e.g., it may reside in a different physical module or on a different circuit board). Data analytics engine 104 may be in communication with each of the platforms 102 and/or datacenter management platform 106 through communication interface 306 and may receive telemetry data from the platforms 102 and/or datacenter management platform 106 and process the telemetry data. In one embodiment, communication interface 306 uses an out-of-band approach to communication with manageability engines 126 and an in-band approach to communicate directly with the hypervisors 120 or operating systems running on the platforms 102.

Data analytics module 308 may include any suitable logic to warehouse, process, and/or learn from the telemetry data collected to guide future optimization decisions made by the platforms 102 or datacenter management platform 106. Data analytics module 308 may aggregate telemetry data, filter telemetry data, average telemetry data, or otherwise process the telemetry data.

Figure 4:
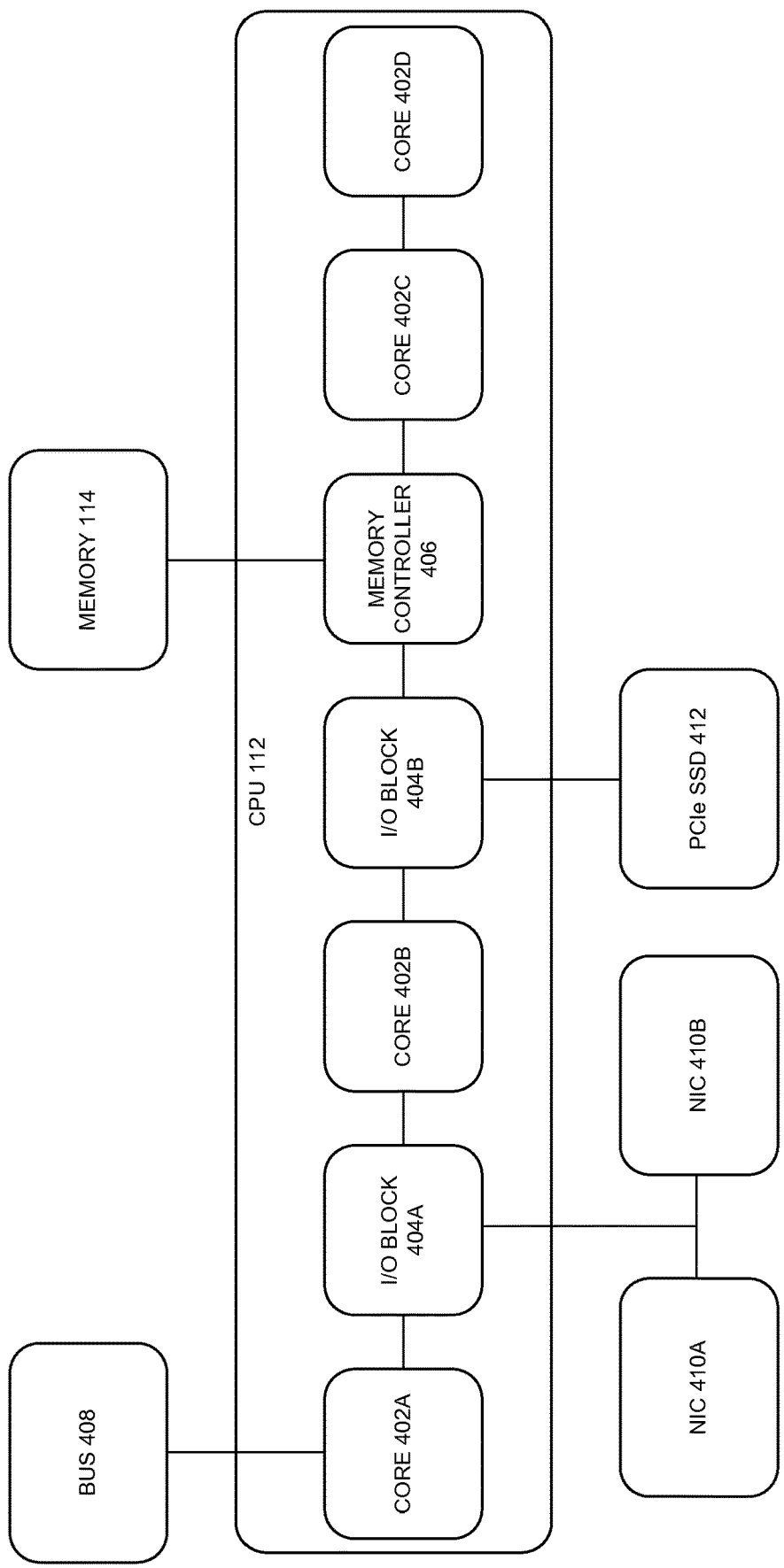
FIG. 4 illustrates a block diagram of a central processing unit in accordance with certain embodiments.

FIG. 4 illustrates a block diagram of a central processing unit (CPU) 112 coupled to various other components of platform 102 in accordance with certain embodiments. Although CPU 112 depicts a particular configuration, the cores and other components of CPU 112 may be arranged in any suitable manner. CPU 112 may comprise any processor or processing device, such as a microprocessor, an embedded processor, a digital signal processor (DSP), a network processor, an application processor, a co-processor, a system on a chip (SOC), or other device to execute code. CPU 112, in the depicted embodiment, includes four processing elements (cores 402 in the depicted embodiment), which may include asymmetric processing elements or symmetric processing elements. However, CPU 112 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical CPU 112, as illustrated in FIG. 4, includes four cores—cores 402A, 402B, 402C, and 402D, though a CPU may include any suitable number of cores. Here, cores 402 may be considered symmetric cores. In another embodiment, cores may include one or more out-of-order processor cores or one or more in-order processor cores. However, cores 402 may be individually selected from any type of core, such as a native core, a software managed core, a core adapted to execute a native Instruction Set Architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

A core 402 may include a decode module coupled to a fetch unit to decode fetched elements. Fetch logic, in one embodiment, includes individual sequencers associated with thread slots of cores 402. Usually a core 402 is associated with a first ISA, which defines/specifies instructions executable on core 402. Often machine code instructions that are part of the first ISA include a portion of the instruction (referred to as an opcode), which references/specifies an instruction or operation to be performed. The decode logic may include circuitry that recognizes these instructions from their opcodes and passes the decoded instructions on in the pipeline for processing as defined by the first ISA. For example, as decoders may, in one embodiment, include logic designed or adapted to recognize specific instructions, such as transactional instructions. As a result of the recognition by the decoders, the architecture of core 402 takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores 402, in one embodiment, recognize the same ISA (or a subset thereof). Alternatively, in a heterogeneous core environment, a decoder of one or more cores (e.g., core 402B) may recognize a second ISA (either a subset of the first ISA or a distinct ISA).

In various embodiments, cores 402 may also include one or more arithmetic logic units (ALUs), floating point units (FPUs), caches, instruction pipelines, interrupt handling hardware, registers, or other suitable hardware to facilitate the operations of the cores 402.

Bus 408 may represent any suitable interconnect coupled to CPU 112. In one example, bus 408 may couple CPU 112 to another CPU of platform logic 102 (e.g., via QPI). I/O blocks 404 represents interfacing logic to couple I/O devices 410 and 412 to cores of CPU 112. In various embodiments, an I/O block 404 may include an I/O controller that is integrated onto the same package as cores 402 or may simply include interfacing logic to couple to an I/O controller that is located off-chip. As one example, I/O blocks 404 may include PCIe interfacing logic. Similarly, memory controller 406 represents interfacing logic to couple memory 114 to cores of CPU 112. In various embodiments, memory controller 406 is integrated onto the same package as cores 402. In alternative embodiments, a memory controller could be located off chip.

In the embodiment depicted, cores 402 are coupled to each other and to other components of platform 102 via I/O blocks 404A and 404B, memory controller 406, and bus 408. FIG. 4 depicts non-uniformities that may exist in various topologies and which may be discovered by benchmark tests performed (e.g., by hypervisor 120 or I/O device driver 124) and taken into account as optimizations are made within datacenter 100.

As various examples, in the embodiment depicted, core 402A may have a relatively high bandwidth and lower latency to devices coupled to bus 408 (e.g., other CPUs 112) and to NICs 410, but a relatively low bandwidth and higher latency to memory 114 or core 402D. Core 402B may have relatively high bandwidths and low latency to both NICs 410 and PCIe solid state drive (SSD) 412 and moderate bandwidths and latencies to devices coupled to bus 408 and core 402D. Core 402C would have relatively high bandwidths and low latencies to memory 114 and core 402D. Finally, core 402D would have a relatively high bandwidth and low latency to core 402C, but relatively low bandwidths and high latencies to NICs 410, core 402A, and devices coupled to bus 408.

Optimizations made within the platform 102 may be based on the non-uniformity present within CPUs of the platform. For example, if one virtual machine 132 will be frequently communicating with another virtual machine 132 (e.g., the first virtual machine could be one block in an SFC and the second virtual machine could be the next block), then the first virtual machine might be placed on core 402C and the second virtual machine placed on core 402D (core thread contention issues may make it undesirable to place both virtual machines on the same core). Another example may include delivering NIC interrupts (by an I/O device driver 124) to core 402A or 402B for high bandwidth and low latency. Yet other examples may include placing a virtual machine that frequently accesses memory 114 on core 402C or a process that frequently accesses SSD 412 on core 402B.

Figure 5:
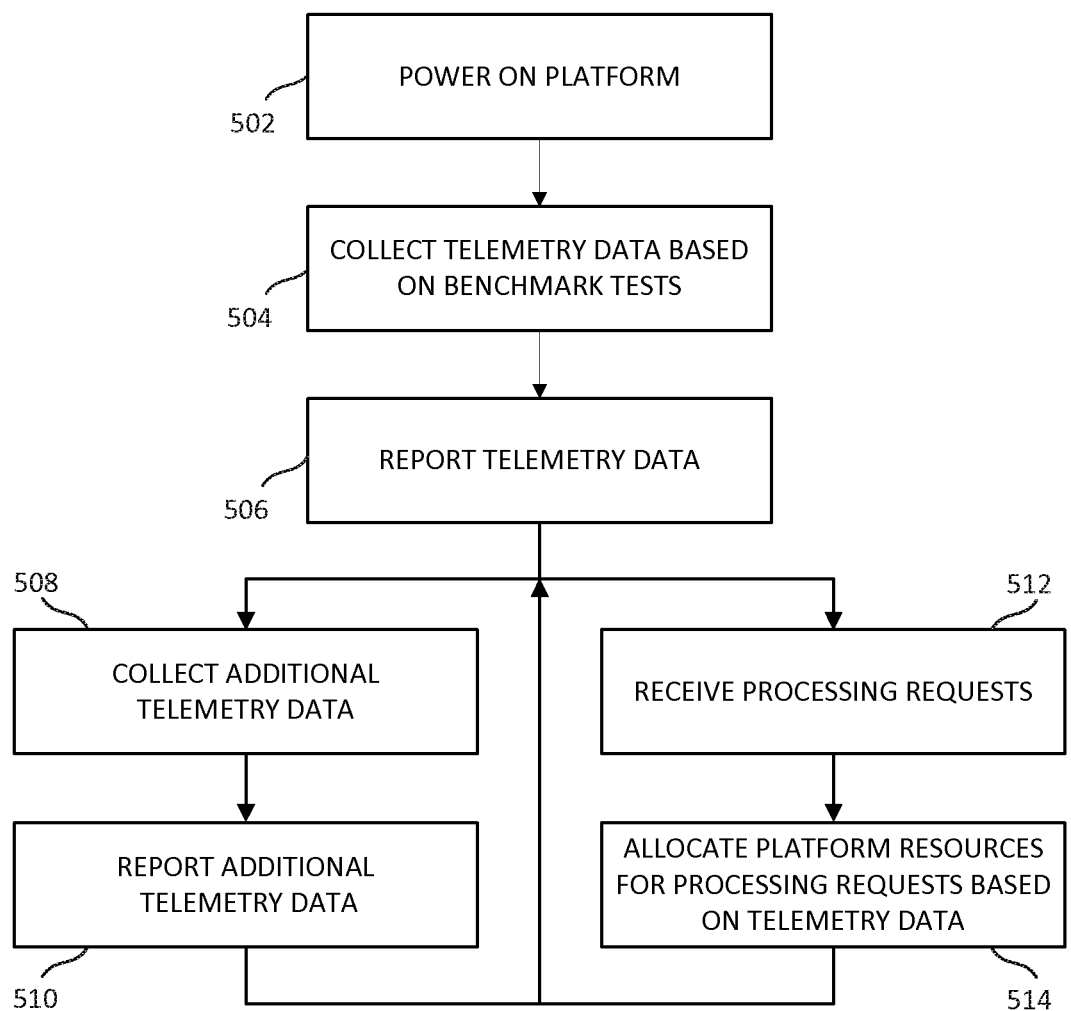
FIG. 5 illustrates a method for allocating platform resources based on telemetry data in accordance with certain embodiments.

FIG. 5 illustrates a method for allocating platform resources based on telemetry data in accordance with certain embodiments. At step 502, a platform 102 is powered on. At step 504, telemetry data based on benchmark tests is collected. The collection of this data may be initiated and/or collected by any suitable entity, such as datacenter management platform 106, one or more manageability engines 126, hypervisor 120 or other operating system, or one or more I/O device drivers 124. Any suitable telemetry data may be collected. In a particular embodiment, the telemetry data collected may indicate a topology of at least a portion of the platform logic of the platform 102. For example, for each core of the platform logic, the topology data may include an indication of a bandwidth or a latency from the core to each of one or more memory modules of the platform logic. As another example, for each core of the platform logic, the telemetry data may comprise an indication of a bandwidth or a latency from the core to each other core of the platform logic. As another example, for each core of the platform logic, the telemetry data may comprise an indication of a bandwidth or a latency from the core to each of one or more I/O devices of the platform logic. At step 506, the telemetry data may be reported from the entity that collected it to any other suitable entity, such as datacenter management platform 106, manageability engine 126, hypervisor 120 or other operating system, an I/O device driver 124, or data analytics engine 104.

At step 508, additional telemetry data may be collected and then reported at step 510. Any suitable telemetry data may be collected and reported during these steps, such as any of the telemetry data described above in connection with step 504 or in connection with the previous figures. Again the telemetry data may be reported from the entity that collected it to any other suitable entity, such as datacenter management platform 106, one or more manageability engines 126, hypervisor 120, one or more I/O device drivers 124, or data analytics engine 104.

In parallel with step 508 and/or step 510, processing requests may be received at step 512 and platform resources may be allocated based on the telemetry data at step 514. A processing request may include any suitable request that involves the use of the platform logic, such as a request to provision a guest system, a request to provision an I/O device driver 124, a request to perform a workload (e.g., a process or thread) associated with a guest system and/or application, a network packet addressed to a guest system, or other suitable processing request. The processing request may be received at any suitable entity, such as hypervisor 120, an I/O device driver 124, or datacenter management platform 106. The receiving entity may, alone or in combination with other entities of datacenter 100, allocate platform resources for the request based on available telemetry data. The platform resources may be allocated in a manner that optimizes the performance of the processing request, the overall platform performance, and/or the overall datacenter performance. Steps 508-514 may be performed any suitable number of times, allowing resource allocation decisions to be based on the current state of the platform.

Some of the steps illustrated in FIG. 5 may be repeated, combined, modified or deleted where appropriate, and additional steps may also be added to the flowchart. Additionally, steps may be performed in any suitable order without departing from the scope of particular embodiments.

"Logic" (e.g., as found in platform logic 110, monitoring logic 140, resource allocation logic 142, resource allocation logic 144 or in other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 418 A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In one embodiment, a system comprises platform logic comprising a plurality of processor cores and resource allocation logic. The resource allocation logic is to receive a processing request and direct the processing request to a processor core of the plurality of processor cores, wherein the processor core is selected based at least in part on telemetry data associated with the platform logic, the telemetry data indicating a topology of at least a portion of the platform logic.

The system may further comprise an I/O device driver comprising at least a portion of the resource allocation logic, and directing the processing request to the processor core may comprise sending an interrupt by the I/O device driver to the processor core. The I/O device driver may run benchmark tests on the platform logic to collect the telemetry data.

The telemetry data indicating the topology of at least a portion of the platform logic may comprise an indication of a bandwidth or a latency from the processor core to a memory of the platform logic. The telemetry data indicating the topology of at least a portion of the platform logic may comprise an indication of a bandwidth or a latency from the processor core to another processor core of the plurality of processor cores. The telemetry data indicating the topology of at least a portion of the platform logic may comprises an indication of a bandwidth or a latency from the processor core to an I/O device of the platform logic. The telemetry data may further indicate current bandwidths used by the processor cores.

The resource allocation logic may select the processor core based on the processor core having a highest expected performance for the processing request of the plurality of processors when an aggregate used bandwidth of the plurality of processors is below a particular threshold. The resource allocation logic may select the processor core based on an optimization of overall bandwidth of the plurality of processors when an aggregate used bandwidth of the plurality of processors is above a particular threshold.

The processing request may comprise a request to instantiate an I/O device driver. The processing request may comprise a request to instantiate a virtual machine. The processing request may be associated with a service function chain or a virtual network function running on the platform logic.

The system may further comprise a manageability engine to collect additional telemetry data associated with the platform logic in a manner that is out-of-band with respect to the plurality of processor cores. The manageability engine may send the additional telemetry data to a datacenter management platform that receives telemetry data from a plurality of distinct platforms, each platform comprising at least one processor core. The manageability engine may run benchmark tests on the platform logic to collect the telemetry data indicating the topology of at least a portion of the platform logic.

A hypervisor or operating system executed by the platform logic may run benchmark tests on the platform logic to collect the telemetry data indicating the topology of at least a portion of the platform logic. The system may further comprise a hypervisor comprising the resource allocation logic, the resource allocation logic of the hypervisor to select the processor core based further on one or more performance requirements associated with the processing request.

In one embodiments, a method may comprise receiving, at an input/output device driver, a processing request; selecting, by the input/output device driver, a processor core of a plurality of processor cores based at least in part on telemetry data associated with the processor cores; and sending, by the input/output device driver, an interrupt signal associated with the processing request to the selected processor core.

The telemetry data may indicate a topology of at least a portion of the processor cores. The telemetry data may indicates at least one of: a bandwidth or a latency from the processor core to a memory coupled to at least some of the processor cores; a bandwidth or a latency from the processor core to another processor core of the plurality of processor cores; and a bandwidth or a latency from the processor core to an input/output device.

The method may further comprise running, by the input/output device driver, benchmark test on the processor cores to collect the telemetry data. The method may further comprise selecting the processing core based on the processor core having a highest expected performance for the processing request of the plurality of processors when an aggregate used bandwidth of the plurality of processors is below a particular threshold. The method may further comprise selecting the processor core further based on an optimization of overall bandwidth of the plurality of processors when an aggregate used bandwidth of the plurality of processors is above a particular threshold.

The processing request may comprise a request to instantiate an I/O device driver or a request to instantiate a virtual machine.

The method may further comprise collecting, by a manageability engine, additional telemetry data in a manner that is out-of-band with respect to the plurality of processor cores.

A system may comprise a plurality of platforms, a platform comprising a plurality of processor cores; and a datacenter management platform coupled to the plurality of platforms through a network. The datacenter management platform may receive telemetry data from the plurality of platforms, the telemetry data indicating performance metrics associated with the processor cores of each of the platforms; receive an indication of at least one workload to be executed by a platform of the plurality of platforms; select a platform of the plurality of platforms based on the telemetry data received from the platforms; and direct the placement of the workload onto the selected platform.

The workload may comprise a service function chain or a virtual network function and directing the placement of the workload onto the selected platform may include migrating the service function chain or virtual network function from a first platform of the plurality of platforms to the selected platform.

The telemetry data may further indicate a topology of processor cores of a platform. The datacenter management platform may receive at least a portion of the telemetry data from one or more of a manageability engine of a platform, the manageability engine collecting and sending the telemetry data in a manner that is an out-of-band with respect to the processor cores of the platform; a hypervisor running on the platform; and an input/output device driver of the platform.

In one embodiment, at least one machine readable storage medium may having instructions stored thereon. The instructions when executed by a machine may cause the machine to receive, at an input/output device driver, a processing request; select, by the input/output device driver, a processor core of a plurality of processor cores based at least in part on telemetry data associated with the processor cores; and send, by the input/output device driver, an interrupt signal associated with the processing request to the selected processor core.

The telemetry data may comprise an indication of a topology of at least a portion of the processor cores. The telemetry data may comprise an indication of a bandwidth or a latency from the processor core to another processor core of the plurality of processor cores. The telemetry data may comprise an indication of a bandwidth or a latency from the processor core to an I/O device. The instructions when executed may further cause the machine to run benchmark tests on the plurality of processor cores to collect the telemetry data.

In one embodiment, a system comprises platform logic comprising a plurality of processor cores; means for receiving a processing request; and means for directing the processing request to a processor core of the plurality of processor cores, wherein the processor core is selected based at least in part on telemetry data associated with the platform logic, the telemetry data indicating a topology of at least a portion of the platform logic.

Directing the processing request to the processor core may comprise sending an interrupt to the processor core. The telemetry data may comprises an indication of a topology of at least a portion of the platform logic. The telemetry data may comprise an indication of a bandwidth or a latency from the processor core to another processor core of the plurality of processor cores. The telemetry data may comprise an indication of a bandwidth or a latency from the processor core to an I/O device. The system may further comprise means to run benchmark tests on the platform logic to collect the telemetry data.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
a platform comprising a plurality of processor cores; and
an input/output (I/O) device driver to:
receive telemetry comprising global network topology data of a datacenter, including available bandwidth between processor cores and other resources;
receive a processing request; and
direct the processing request to a local processor core of the plurality of processor cores, comprising sending an interrupt by the I/O device driver to the local processor core, wherein the local processor core is selected by the I/O device driver based at least in part on the global network topology data.

2. The system of claim 1, the I/O device driver further to run benchmark tests on the platform to collect the global network topology data.

3. The system of claim 1, wherein the global network topology data comprises an indication of a bandwidth or a latency from the local processor core to a memory of the platform.

4. The system of claim 1, wherein the global network topology data comprises an indication of a bandwidth or a latency from the local processor core to another processor core of the plurality of processor cores.

5. The system of claim 1, wherein the global network topology data comprises an indication of a bandwidth or a latency from the local processor core to an I/O device of the platform.

6. The system of claim 1, wherein the local processor core is selected further based at least in part on current bandwidths used by the plurality of processor cores.

7. The system of claim 6, wherein the I/O device driver is to select the local processor core based on the local processor core having a highest expected performance for the processing request of the plurality of processor cores when an aggregate used bandwidth of the plurality of processor cores is below a particular threshold.

8. The system of claim 6, wherein the I/O device driver is to select the local processor core based on an optimization of overall bandwidth of the plurality of processor cores when an aggregate used bandwidth of the plurality of processor cores is above a particular threshold.

9. The system of claim 1, wherein the processing request comprises a request to instantiate an I/O device driver.

10. The system of claim 1, wherein the processing request comprises a request to instantiate a virtual machine.

11. The system of claim 1, wherein the processing request is associated with a service function chain or a virtual network function running on the platform.

12. The system of claim 1, further comprising a manageability engine to collect additional global network topology data associated with the platform in a manner that is out-of-band with respect to the plurality of processor cores.

13. The system of claim 12, wherein the manageability engine is further to send the additional global network topology data to a datacenter management platform that receives global network topology data from a plurality of distinct platforms, each platform comprising at least one processor core.

14. The system of claim 12, wherein the manageability engine is further to run benchmark tests on the platform to collect the global network topology data indicating a topology of at least a portion of the platform.

15. The system of claim 1, wherein a hypervisor or operating system executed by the platform is to run benchmark tests on the platform to collect the telemetry comprising global network topology data including available bandwidth between processor cores and other resources.

16. The system of claim 1, further comprising a hypervisor comprising the I/O device driver, the I/O device driver of the hypervisor to select the local processor core based further on one or more performance requirements associated with the processing request.

17. A method comprising:
receiving, at an input/output device driver, a processing request;
selecting, by the input/output device driver, a local processor core of a plurality of processor cores based at least in part on telemetry comprising global network topology data of a datacenter and further comprising an indication of a topology of at least a portion of the plurality of processor cores, the topology including available bandwidth between processor cores and other resources; and
sending, by the input/output device driver, an interrupt signal associated with the processing request to the selected local processor core.

18. The method of claim 17, wherein the global network topology data comprises an indication of a bandwidth or a latency from the local processor core to another processor core of the plurality of processor cores.

19. At least one non-transitory machine readable storage medium having instructions stored thereon, the instructions when executed by a machine to cause the machine to:
receive, at an input/output device driver, a processing request;
select, by the input/output device driver, a local processor core of a plurality of processor cores based at least in part on telemetry comprising global network topology data of a datacenter, including available bandwidth between processor cores and other resources; and
send, by the input/output device driver, an interrupt signal associated with the processing request to the selected local processor core.

20. The medium of claim 19, wherein the global network topology data comprises an indication of a bandwidth or a latency from the selected local processor core to another processor core of the plurality of processor cores.

21. The medium of claim 19, wherein the global network topology data comprises an indication of a bandwidth or a latency from the selected local processor core to an I/O device.

22. The medium of claim 19, wherein the instructions when executed are further to cause the machine to run benchmark tests on the plurality of processor cores to collect the global network topology data.

23. The medium of claim 19, wherein the processing request comprises a request to instantiate an I/O device driver.

* * * * *

UNITED STATES PATENT AND TRADEMARK OFFICE
CERTIFICATE OF CORRECTION

PATENT NO. : 10,860,374 B2  
APPLICATION NO. : 14/866869  
DATED : December 8, 2020  
INVENTOR(S) : Hearn et al.

Page 1 of 1

It is certified that error appears in the above-identified patent and that said Letters Patent is hereby corrected as shown below:

On the Title Page

In Column 1, under item (72) "Inventors:", Line 4, delete "Dubai" and insert -- Dubal --, therefor.

Signed and Sealed this  
Nineteenth Day of January, 2021

Andrei Iancu  
*Director of the United States Patent and Trademark Office*